United States Patent [19]
Chung-Shan

[11] Patent Number: 5,203,376
[45] Date of Patent: Apr. 20, 1993

[54] SELF-SHUTTING EGRESS VALVE

[76] Inventor: Sheen Chung-Shan, No. 34, Hehping Road, Huwei Chen, Yunlin Hsuan, Taiwan

[21] Appl. No.: 855,786

[22] Filed: Mar. 23, 1992

[51] Int. Cl.$^5$ ............................................. F16K 21/16
[52] U.S. Cl. .................................... 137/801; 251/51; 251/52; 251/339
[58] Field of Search .................... 137/801; 251/51, 52, 251/339

[56] References Cited

U.S. PATENT DOCUMENTS

| | | | |
|---|---|---|---|
| 1,995,792 | 3/1935 | Brown | 251/52 |
| 2,710,736 | 6/1955 | Miller | 251/51 |
| 3,920,216 | 11/1975 | Barnum | 251/51 |
| 4,940,206 | 7/1990 | Sheen | 251/339 X |
| 4,981,160 | 1/1991 | Tein | 251/52 X |

*Primary Examiner*—Robert G. Nilson

[57] ABSTRACT

A self-shutting egress valve comprises a hollow valve body having an annular valve seat provided in a lower portion thereof, a valve piston movably positioned within the valve body and having an escape valve provided on an upper portion thereof, and a push rod depending from the valve piston. The valve body has an orifice and a set of inlet apertures formed respectively on a top portion and around a lower periphery thereon. The valve piston carries an annular, elastic flow controlling element thereon which engages the walls of an upper chamber in the valve body. A set of apertures formed around an upper portion of the push rod is in communication with the escape valve thereabove. Pushing up on the push rod opens the escape valve and thrusts the valve piston upward into the upper chamber of the valve body causing fluid to flow downwards therethrough and also around the flow controlling element. Fluid flows through the inlet apertures and out an egress space between the valve piston and valve seat once the two are separated. The valve piston automatically descends within the upper chamber under the action of fluid entering therein through the orifice with the escape valve and the flow controlling element preventing backflow.

15 Claims, 4 Drawing Sheets

SELF-SHUTTING EGRESS VALVE

BACKGROUND OF THE PRESENT INVENTION

The present invention relates to an egress valve and more particularly to a self-shutting egress valve for use in a fluid tap.

Self-shutting egress valves of the generic type that include a protruding push rod therebelow and which are actuated by pushing the rod inwards are well known in the art. A related egress valve was also disclosed in U.K. Pat. No. 2,242,004 by the present applicant.

However, the novel structure of the self-shutting egress valve of the present invention can provide a less forceful actuation as well as other advantages which will become apparent in the disclosure below.

SUMMARY OF THE PRESENT INVENTION

The present invention has as a main object to provide a self-shutting egress valve for use in a fluid tap that is manually opened by actuating a self-cleaning push rod thereon and which automatically shuts off after a predetermined time period.

In accordance therewith, the egress valve comprises a hollow valve body having an annular valve seat provided in a lower portion thereof, a valve piston having an axial bore movably positioned within the valve body, an elongate push rod depending from the valve piston, and an escape valve provided on an upper portion of the valve piston.

By applying an upward pressure against the push rod, the valve piston is caused to rise within the valve body with the escape valve thereon being in an open state. An annular, elastic flow controlling element positioned around the valve piston enables fluid from an interior space above the rising piston to flow downwards therefrom. A portion of the fluid therein also flows downwards through the escape valve which is in communication with a fluid conduit formed in the push rod. Fluid from the tap flows through inlet apertures formed around the valve body and out through an egress space surrounding the push rod when the valve piston is spaced from the valve seat. After the push rod and valve piston reach their maximum upward displacement in the valve body, the escape valve closes and the assembly begins its descent at a controlled rate under the fluid pressure in the interior space above the valve piston. Fluid enters the interior space above the valve piston during its downward travel through an orifice formed on the top of the valve body with the flow controlling element preventing the backflow of fluid therein from the spaces below. The fluid efflux stops when the valve piston once again is in abutment with the valve seat.

A more thorough understanding of the structure and operation of the egress valve of the present invention will be attained by referring to a detailed description of a preferred embodiment thereof provided below along with accompanying drawings.

A BRIEF DESCRIPTION OF THE DRAWINGS

DETAILED DESCRIPTION OF THE PREFERRED EMBODIMENT

Figure 1:
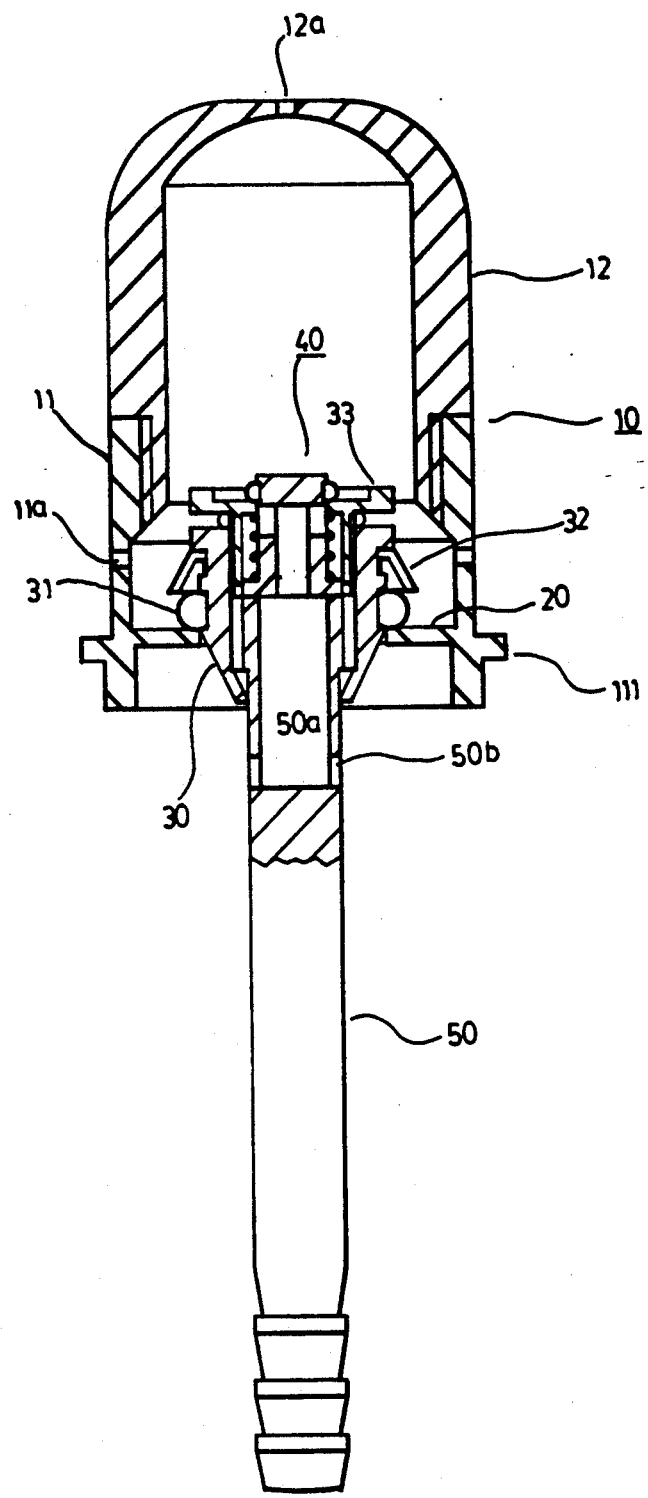
FIG. 1 is a sectional view of the self-shutting egress valve of the present invention with the valve in a closed state.
Figure 2:
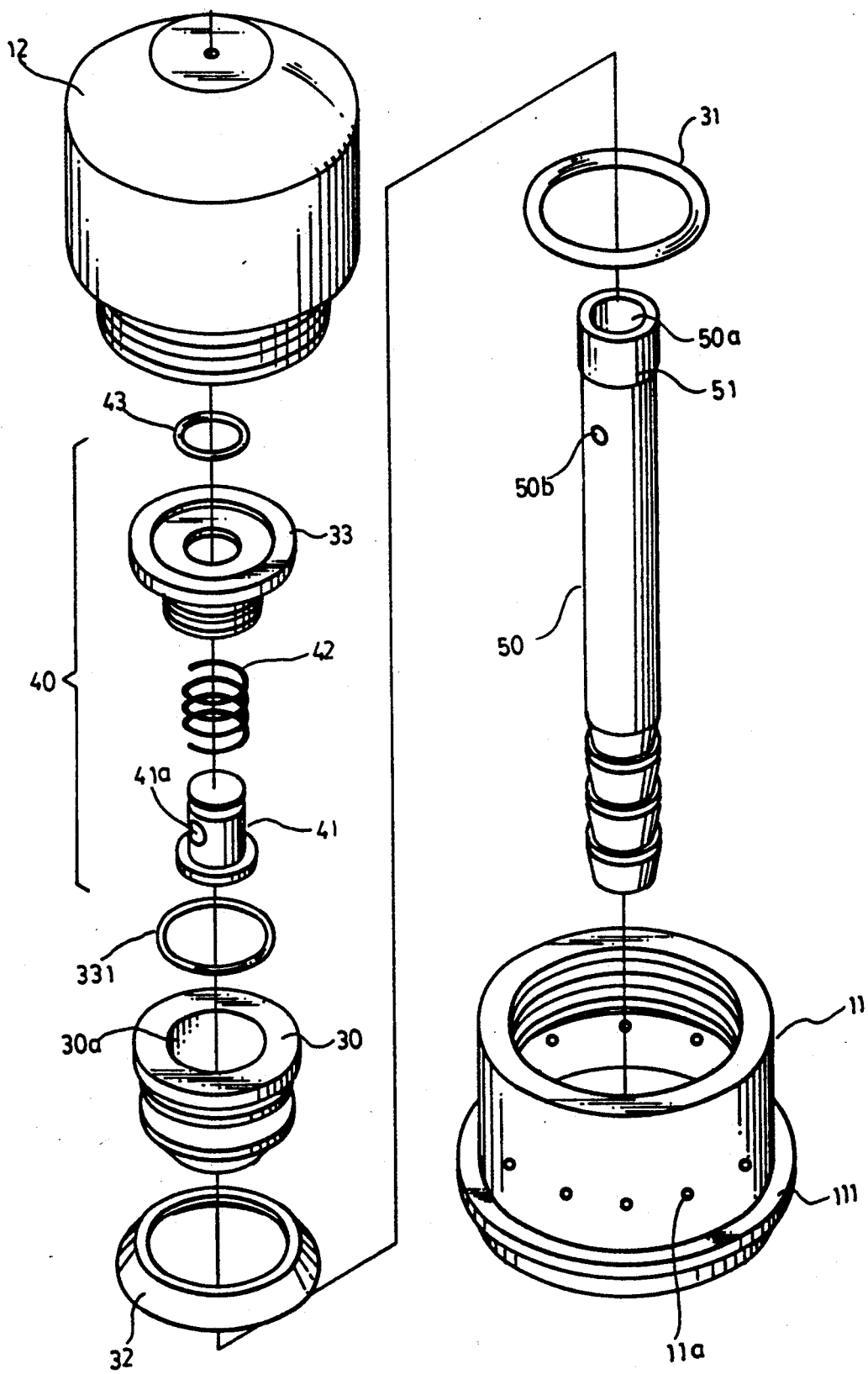
FIG. 2 is an exploded perspective view of the self-shutting egress valve.

Referring to FIGS. 1 and 2, the self-shutting egress valve of the present invention comprises a hollow two-piece valve body 10 having an annular valve seat 20 in a lower member 11 thereof, a valve piston 30 movably positioned therein carrying an escape valve 40 on an upper portion thereof, and an elongate push rod 50 depending therefrom.

Figure 3:
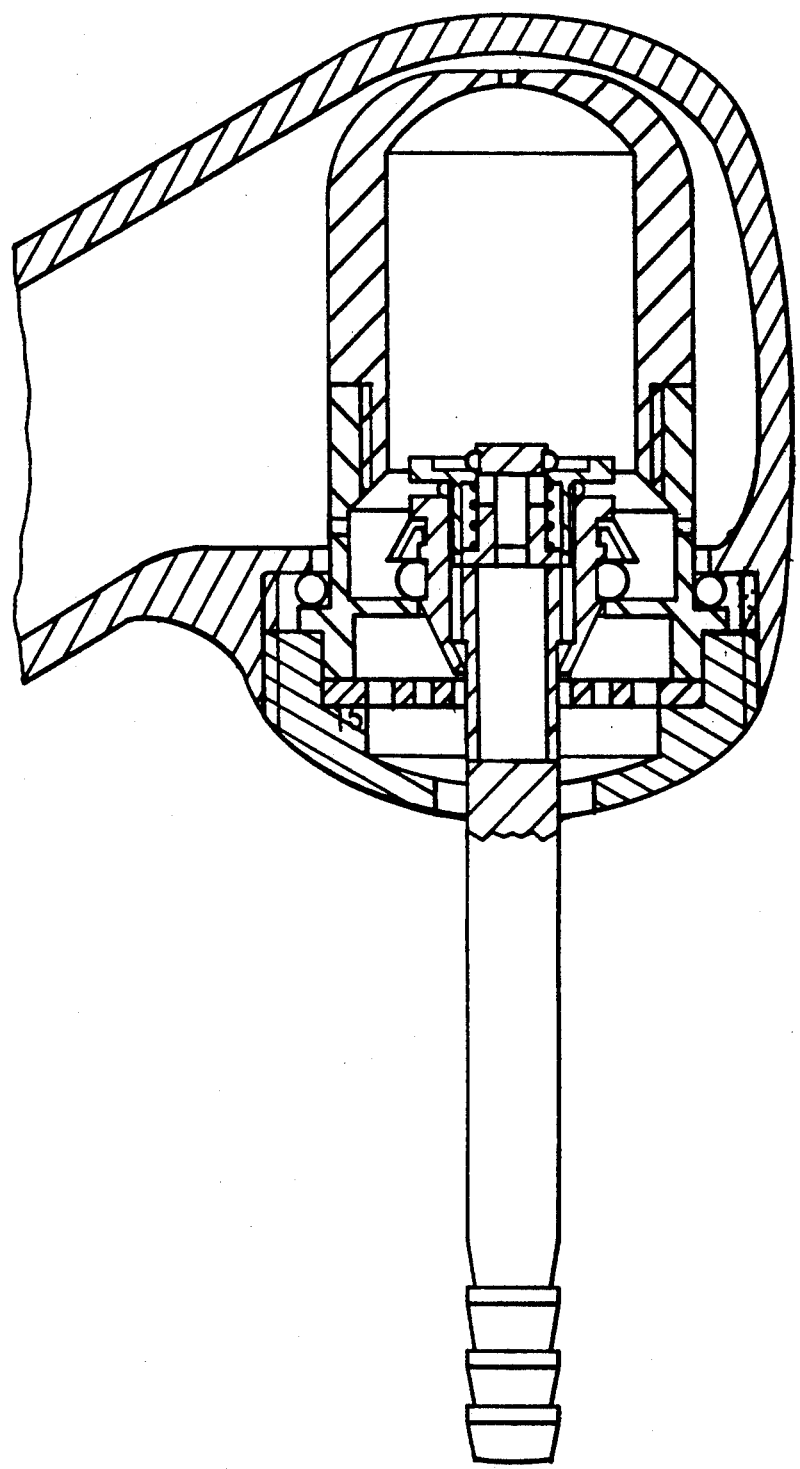
FIG. 3 is a sectional view showing the self-shutting egress valve disposed within the outlet of a water tap spout.

The valve body comprises a cup shaped upper element 12 having a central orifice 12a of predetermined diameter formed on the top thereof and the generally cylindrical lower element 11 which is threadedly coupled to a element 12, with the two elements having differing diameters so as to define an upper chamber of lesser cross-section within the valve body. A set of inlet apertures 11a are formed radially around element 11 through which fluid can pass when the egress valve is in an open state. An annular flange 111 is provided on the lower element below apertures 11a for the securement of the egress valve within the spout of a fluid tap, as shown in FIG. 3.

Valve piston 30 carries an elastic O-ring 31 on a circumferential groove formed around a lower portion thereof which abuts against the annular valve seat when the egress valve is in a closed position, preventing the efflux of fluid therefrom. An annular, elastic flow controlling element 32 similarly positioned above O-ring 31 has a sloped periphery and an annular groove formed around its lower side, its maximum diameter being greater than that of the O-ring and significantly less than the internal diameter of lower element 11 to which it is adjacent when the egress valve is in a closed state. The flow controlling element is adapted for allowing the flow of fluid from the upper chamber of the valve body to the interior space below the flow controlling element when the valve piston is rising therein, while inhibiting the backflow of fluid therearound when the valve piston is descending.

Escape valve 40 is carried by a generally annular bonnet nut 33 which is threadedly attached to the top of the valve piston. An O-ring 331 is disposed between nut 33 and the valve piston to effect a better seal and correct spacing therebetween. The valve comprises a tubular element 41 slidingly retained within the central hole of the bonnet nut, a compression spring 42, and an O-ring 43 attached to the upper end of element 41. Element 41 has a closed upper end and a pair of peripheral apertures 41a formed thereon below the O-ring. The compression spring acts between a lower portion of nut 33 and a flanged lower end of the tubular element so as to urge the element downwards until the O-ring thereon is in abutment with the top of nut 33, at which position the escape valve is in a closed state.

A flanged upper end 51 of push rod 50 is slidingly retained within a stepped diameter axial bore 30a formed in the valve piston and normally rests against the shoulder portion thereof. The upper end of the push rod also has an axial cavity 50a of predetermined depth formed therein with a set of peripheral apertures 50b formed radially around the push rod penetrating to a base portion of the axial cavity, the cavity being in communication with valve 40 thereabove.

Figure 4:
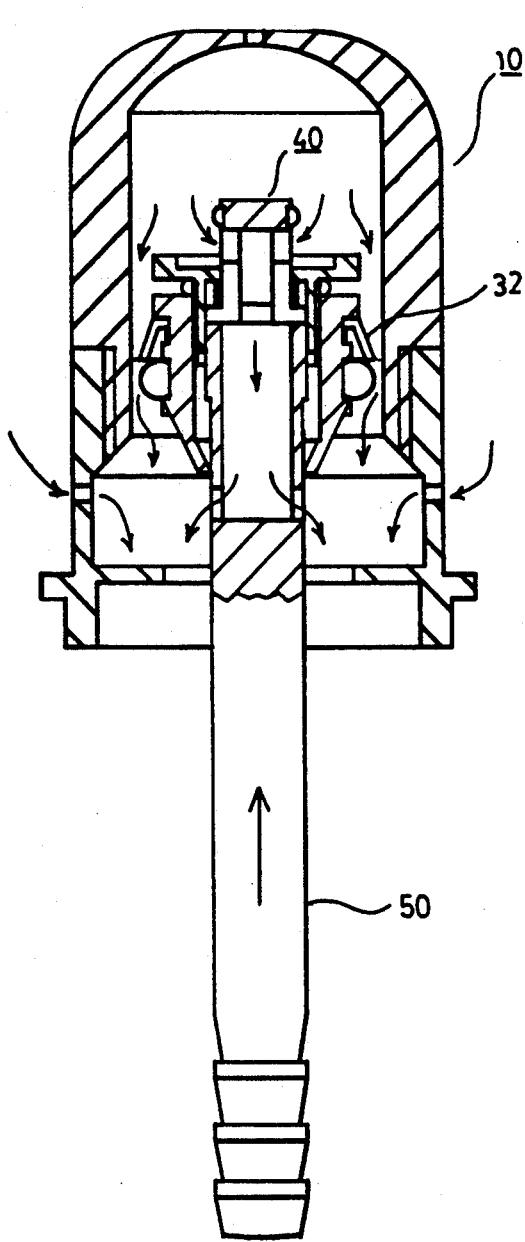
FIG. 4 is a sectional view of the self-shutting egress valve in an open state with a push rod and valve piston thereof rising within the valve body.

In operation, the self-shutting egress valve is opened by manually pushing up push rod 50. In so doing, the tubular element of valve 40 in abutment with the push rod rises within the interior space of the valve body so that apertures 41a are in communication therewith, opening the valve. After the tubular element reaches its maximum extension, the valve piston begins to move upward under the impetus of the push rod. Once O-ring 31 thereon is spaced from valve seat 20, fluid can flow through inlet apertures 11a and efflux out from an annular egress space defined between the valve seat and push rod. As shown in FIG. 4, after traveling upward a predetermined distance the flow controlling element 32 around the valve piston contacts the internal wall of element 12 of the valve body. As the valve piston travels upwards in the upper chamber defined within element 12, the greater fluid pressure therein will cause the sloped peripheral wall of element 32 to constrict radially so as to create an annular space between the element and the walls of the chamber and allow displaced fluid in the chamber to flow downwards therethrough. Displaced fluid from the upper chamber also flows through apertures 41a and out apertures 50b on the push rod, which are always positioned below the valve piston, to mix with the main efflux. As the number and dimensions of apertures 41a and 50b determine the rate of flow through valve 40, the ease of rise of the push rod can be adjusted by the appropriate specification of these parameters.

Figure 5:
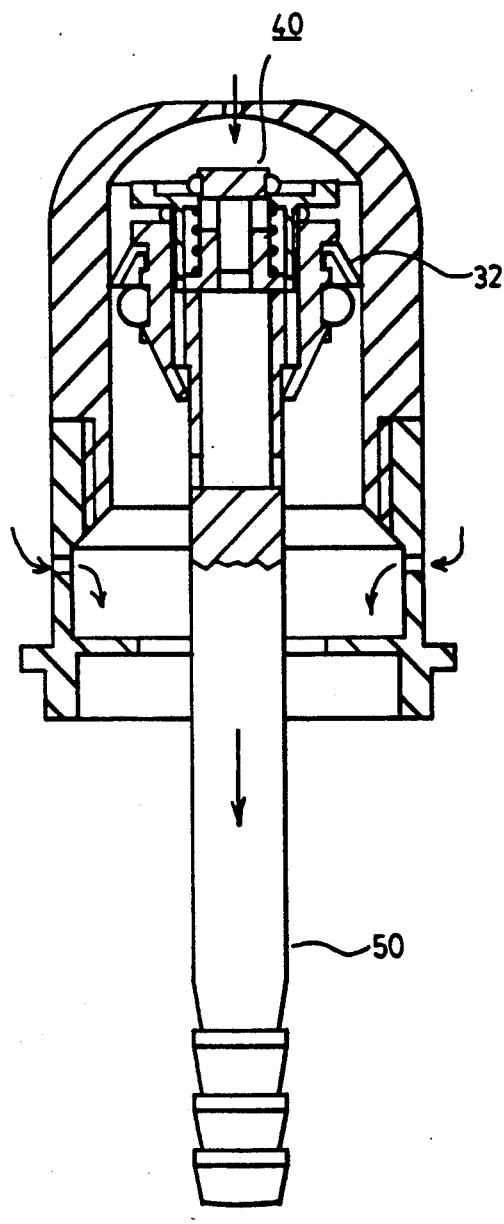
FIG. 5 is a sectional view of the self-shutting egress valve in an open state with the valve piston having reached maximum extension within the valve body and beginning automatic descent under the action of fluid pressure.

The excursion of push rod 50 into the valve body is limited by the abutment of tubular element 41 with the top of the upper chamber therein, afterwhich spring 42 urges the element downward to close valve 40 and push rod 50 likewise moves downward within the valve piston. With reference to FIG. 5, as the static fluid in the upper chamber is still at a significantly higher pressure than the effluxing fluid therebelow, the valve piston will descend from the chamber with the flow controlling element now expanding to prevent the flow of fluid therethrough. Fluid enters the upper chamber through orifice 12a as the valve piston descends with the diameter of the orifice determining its rate of descent. After leaving the upper chamber the valve piston very quickly drops to the annular valve seat to shut off the egress valve.

A user could thus actuate the egress valve in the environment of FIG. 3 and wash his or her hands with the valve automatically shutting off after a predetermined time period. Normally, the valve would be open for several seconds but can be manually closed by pulling down the push rod. A number of circumferential grooves formed around the lower portion thereof facilitates gripping of the push rod and can also be used to attach a cooperating auxiliary appendage. As the push rod is repeatedly washed by each efflux from the valve, operation of the valve remains very sanitary.

Various further modifications or variations could also be made to the egress valve of the present invention without departing from the scope thereof, as could be accomplished by a person of ordinary skill in the art. Accordingly, the spirit and scope of the present invention should not be determined from the specificities of the above description but from the appended claims and their legal equivalents.

I claim:

1. In a fluid tap, a self-shutting egress valve comprising:
    a hollow valve body having an orifice of predetermined diameter on an upper portion thereof and at least one inlet aperture on a peripheral lower portion thereof;
    a generally annular valve seat provided in a lower portion of said valve body below said at least one inlet aperture;
    a valve piston movably positioned within said valve body having an axial bore, the lower portion of said valve piston being abuttable against said valve seat to prevent the efflux of fluid from said self-shutting egress valve;
    an elongate push rod depending from said valve piston, the upper end of said push rod being slidingly retained within said bore, said push rod having at least one conduit provided therein through which said bore is in communication with an exterior space surrounding said push rod, said at least one aperture being in communication with an egress space defined between said push rod and said valve body when said valve piston is spaced from said valve seat;
    a flow controlling means disposed around a peripheral portion of said valve piston for enabling the flow of fluid from an interior portion of said valve body above said flow controlling means to an interior portion of said main body below said flow controlling means upon an upward displacement of said valve piston while inhibiting backflow of fluid from the interior portion of said valve body below said flow controlling means to the interior portion of said valve body above said flow controlling means upon a downward displacement of said valve piston, said orifice being in communication with the interior portion of said valve body above said valve piston;
    valve means provided in an upper portion of said valve piston for enabling the flow of fluid from the interior portion of said valve body above said flow controlling means to said at least one conduit of said push rod via said bore of said valve piston in communication therewith, said valve means being opened by an upward displacement of said push rod;
    wherein, said self-shutting egress valve is disposed within the opening of a spout of said fluid tap.

2. A self-shutting egress valve according to claim 1, wherein said valve means comprises a tubular element having at least one inlet thereon through which fluid from the interior portion of said valve body above said flow controlling means flows when said tubular element is in a raised position, and a biasing means for urging said tubular element downward towards a position whereat said valve means is closed.

3. A self-shutting egress valve according to claim 2, wherein said biasing means comprises a compression spring acting against a flanged lower end of said tubular member, and said at least one inlet comprises an aperture on a peripheral portion of said tubular member which has a closed upper end.

4. A self-shutting egress valve according to claim 3, further comprising and elastic sealing ring disposed on a cooperating circumferential groove formed around said tubular member above said inlet.

5. A self-shutting egress valve according to claim 4, wherein the upper portion of said valve piston includes a generally annular bonnet releasably secured thereon, said bonnet carrying said valve means with said tubular element extendible through the central hole of said bonnet.

6. A self-shutting egress valve according to claim 1, wherein said push rod has at least one circumferential groove formed hereon adapted for facilitating manual closure of said self-shutting egress valve and attachment of an auxiliary appendage thereon.

7. A self-shutting egress valve according to claim 1, wherein said at least one conduit comprises an axial cavity formed in the upper end of said push rod and a set of apertures formed peripherally at predetermined positions on said push rod in communication with said cavity.

8. In a fluid tap, a self-shutting egress valve comprising:
- a hollow valve body having an orifice of predetermined diameter on an upper portion thereof and at least one inlet aperture on a peripheral lower portion thereof;
- a generally annular valve seat provided in a lower portion of said valve body below said at least one inlet aperture;
- a valve piston movably positioned within said valve body having an axial bore, the lower portion of said valve piston being abuttable against said valve seat to prevent the efflux of fluid from said self-shutting egress valve;
- an elongate push rod depending from said valve piston, the upper end of said push rod being slidingly retained within said bore, said push rod having at least one conduit provided therein through which said bore is in communication with an exterior space surrounding said push rod, said at least one aperture being in communication with an egress space defined between said push rod and said valve body when said valve piston is spaced from said valve seat;
- an annular elastic element disposed around a peripheral portion of said valve piston for enabling the flow of fluid from an interior portion of said valve body above said elastic element to an interior portion of said main body below said elastic element upon an upward displacement of said valve piston while inhibiting backflow of fluid from the interior portion of said valve body below said elastic element to the interior portion of said valve body above said elastic element upon a downward displacement of said valve piston, said orifice being in communication with the interior portion of said valve body above said valve piston;
- valve means provided in an upper portion of said valve piston for enabling the flow of fluid from the interior portion of said valve body above said flow controlling means to said at least one conduit of said push rod via said bore of said valve piston in communication therewith, said valve means being opened by an upward displacement of said push rod;

wherein, said self-shutting egress valve is disposed within the opening of a spout of said fluid tap.

9. A self-shutting egress valve according to claim 8, wherein said elastic element has a sloped periphery and a circumferentially grooved underside.

10. A self-shutting egress valve according to claim 8, wherein said valve means comprises a tubular element having at last one inlet thereon through which fluid from the interior portion of said valve body above said flow controlling means flows when said tubular element is in a raised position, and a biasing means for urging said tubular element downward towards a position whereat said valve means is closed.

11. A self-shutting egress valve according to claim 10, wherein said biasing means comprises a compression spring acting against a flanged lower end of said tubular member, and said at least one inlet comprises an aperture on a peripheral portion of said tubular member which has a closed upper end.

12. A self-shutting egress valve according to claim 11, further comprising and elastic sealing ring disposed on a cooperating circumferential groove formed around said tubular member above said inlet.

13. A self-shutting egress valve according to claim 12, wherein the upper portion of said valve piston includes a generally annular bonnet releasably secured thereon, said bonnet carrying said valve means with said tubular element extendible through the central hole of said bonnet.

14. A self-shutting egress valve according to claim 8, wherein said push rod has at least one circumferential groove formed thereon adapted for facilitating manual closure of said self-shutting egress valve and attachment of an auxiliary appendage thereon.

15. A self-shutting egress valve according to claim 8, wherein said at least one conduit comprises an axial cavity formed in the upper end of said push rod and a set of apertures formed peripherally at predetermined positions on said push rod in communication with said cavity.

* * * * *